United States Patent Office 3,337,822
Patented Aug. 22, 1967

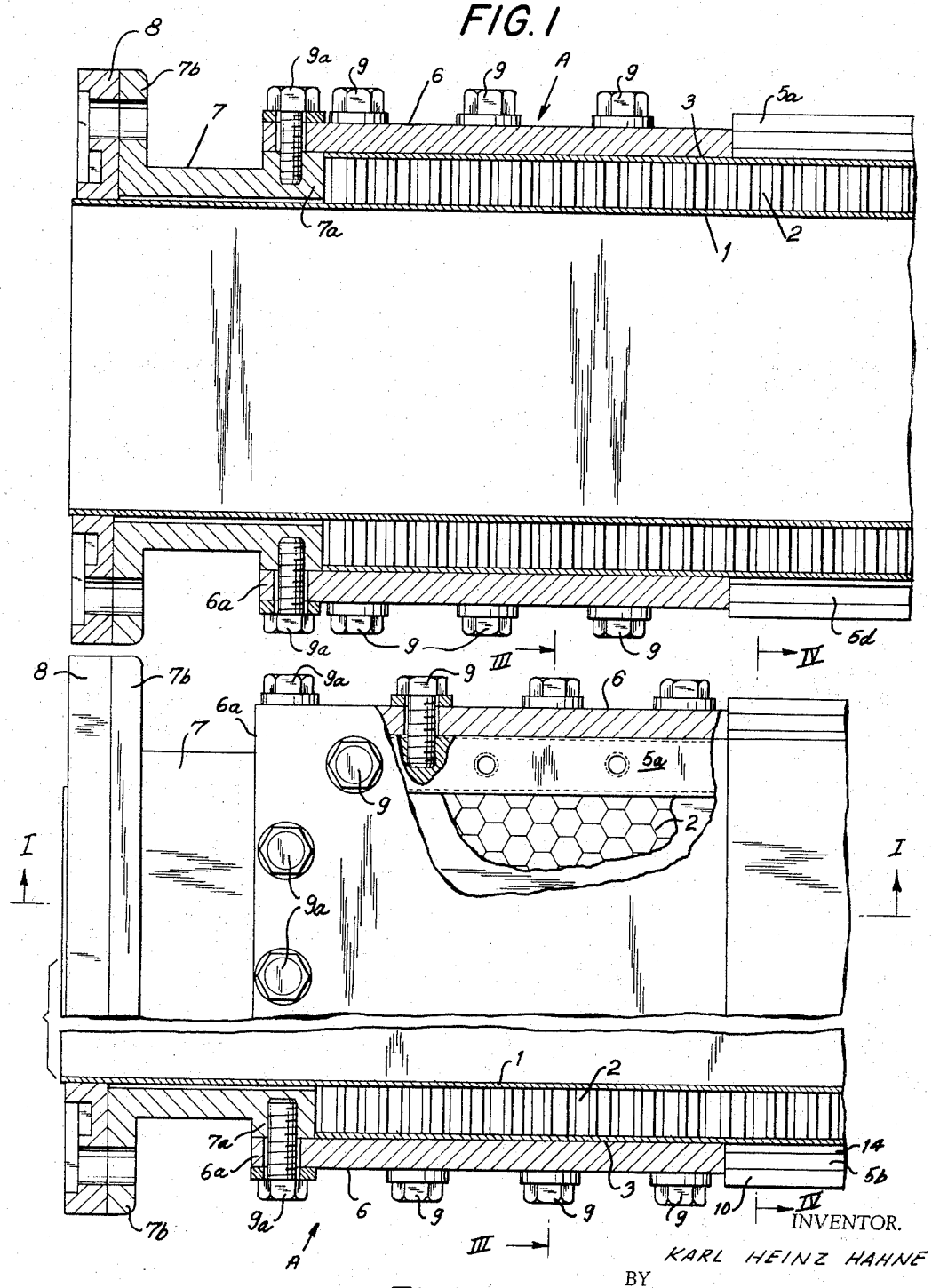

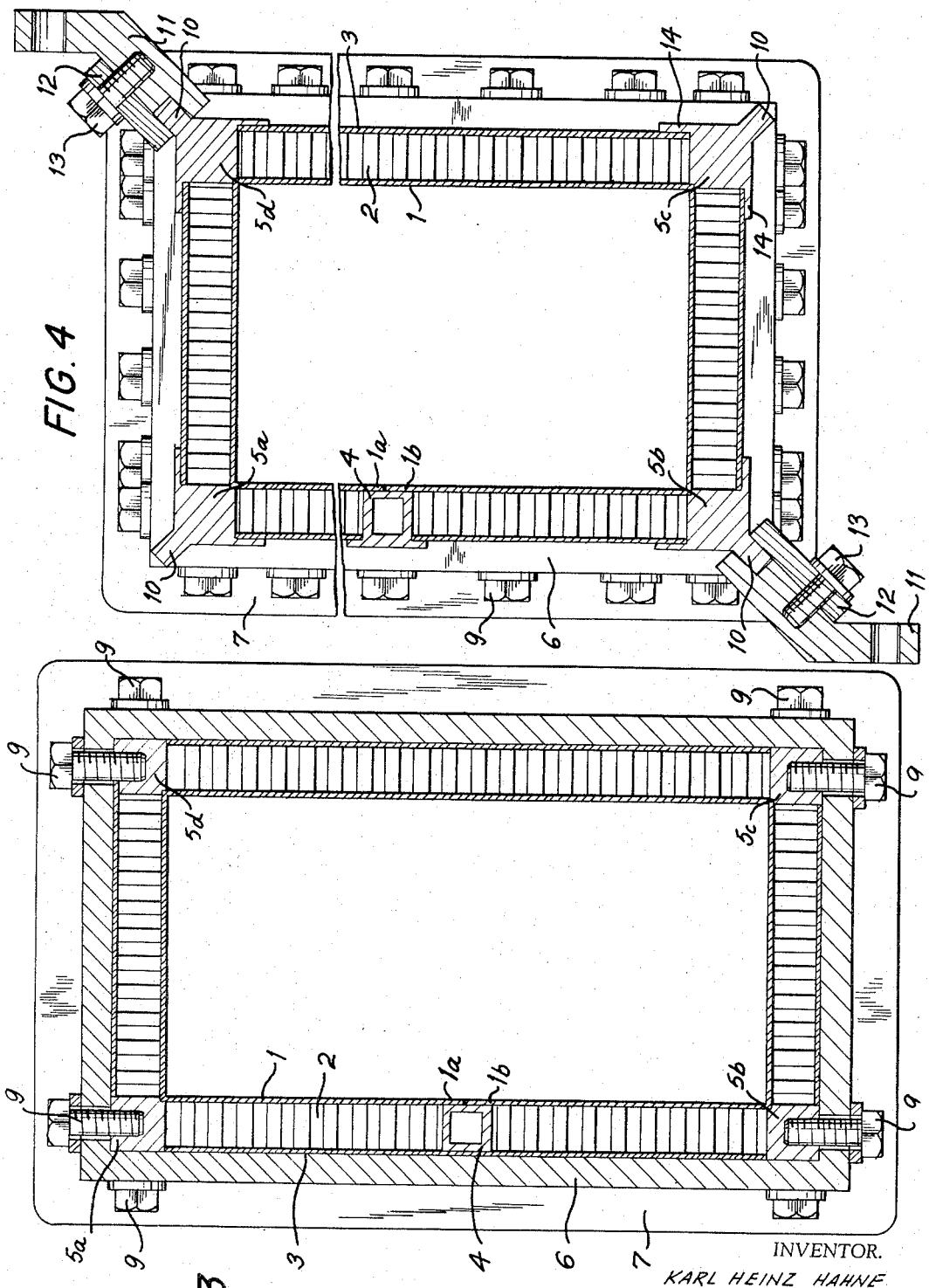

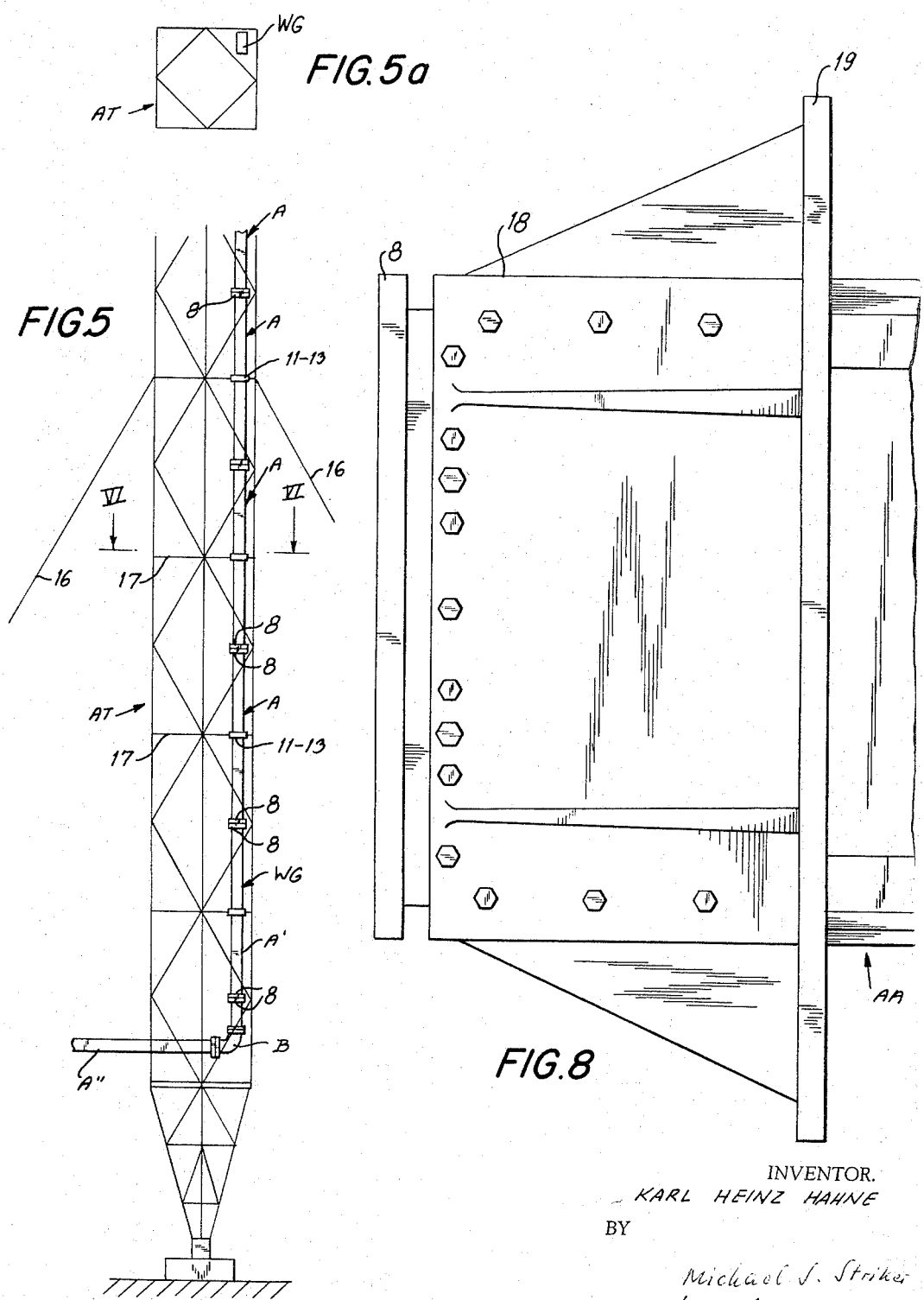

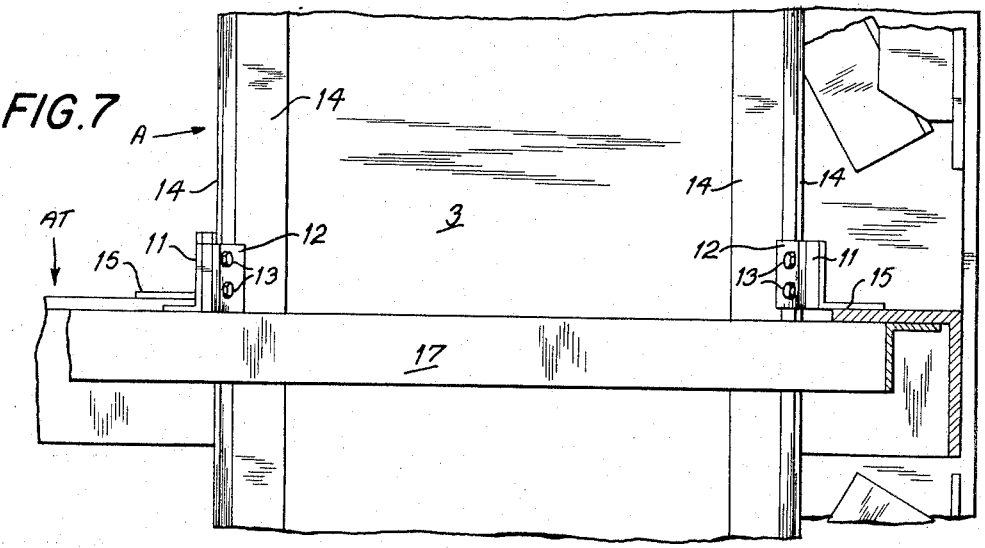
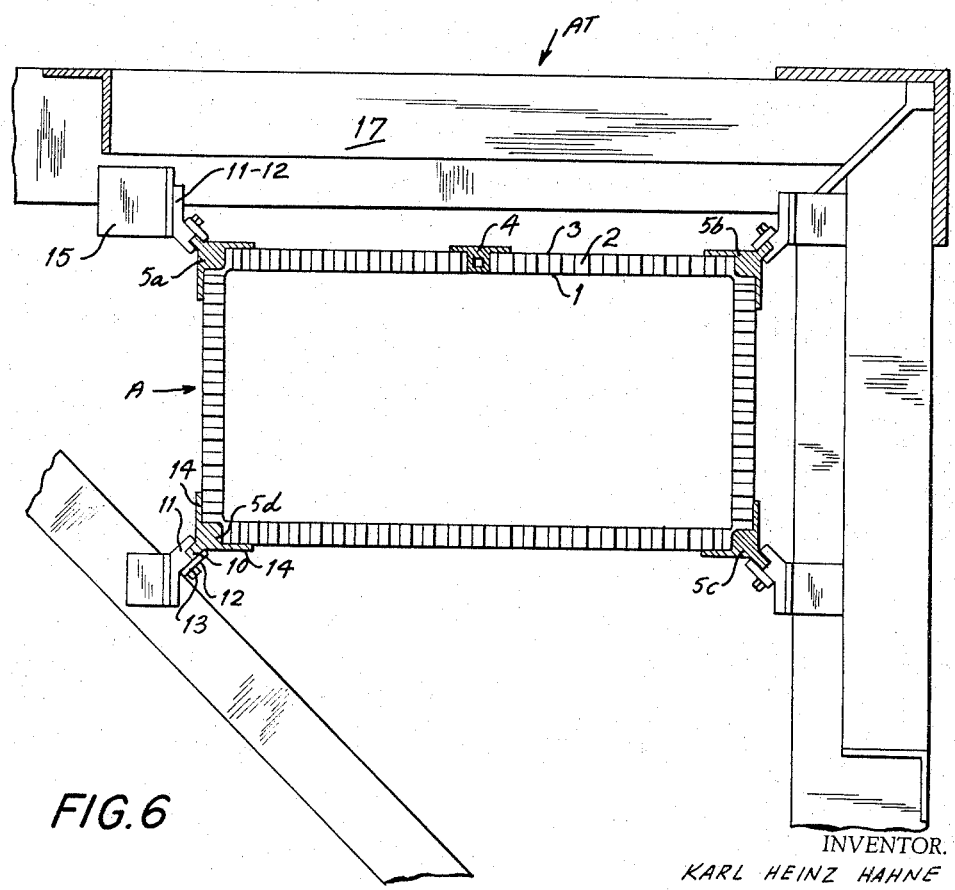

3,337,822
RECTANGULAR WAVE GUIDE
Karl Heinz Hahne, Rosberg, Germany, assignor to Felten & Guilleaume Carlswerk A.G., Cologne-Mulheim, Germany
Filed Mar. 22, 1965, Ser. No. 441,734
Claims priority, application Germany, Mar. 20, 1964, F 42,374
15 Claims. (Cl. 333—95)

The present invention relates to guides for the transmission of electromagnetic waves, and more particularly to improvements in wave guides of the general class disclosed in my copending application Ser. No. 285,327, filed June 4, 1963, now Patent No. 3,234,489.

The aforesaid copending application discloses a rectangular wave guide which may be assembled of flanged sections and wherein the side walls comprise intermediate layers of honeycomb sheets surrounding a circumferentially complete inner layer of sheet metal. The internal surface of the inner layer is formed of a material which is a good conductor of electric current. The cells of the intermediate layers extend in directions which are normal to the corresponding panels of the inner layer so that such honeycomb sheets form a highly satisfactory stiffener for the section and contribute considerably to a reduction in the overall weight of the wave guide. For example, a wave guide which is assembled of such reinforced sections may be utilized to conduct emitting energy to an antenna mounted at the top of a tall tower having a height of three hundred meters (about a thousand feet) or more. If a section is four meters long, the wave guide must be assembled of seventy-five sections and the flanges of such sections are bolted together to form a rigid tubular column. Of course, an upright wave guide having a height of about a thousand feet is subjected to stresses which are different from stresses acting upon a wave guide which is laid along the ground. Also, certain problems arise in devising satisfactory connections between the elements of an aerial tower and an upright wave guide. As a rule, portions of the wave guide consist of copper, aluminum or another good conductor of electric current whereas the elements of an aerial tower normally consist of steel. Therefore, and when the temperature of surrounding air changes, variations in length of the wave guide are different from variations in length of the tower. This is one of the many problems which arise in erecting and securing an upright wave guide of considerable length.

Accordingly, it is an important object of the present invention to provide a novel multi-section wave guide which may be mounted in horizontal, inclined or vertical position, to provide an improved connection between an upright wave guide and its support (e.g., an aerial tower), and to construct the connection in such a way that the wave guide is subjected to negligible mechanical deforming stresses.

Another object of the invention is to provide a wave guide of the just outlined type whose energy-transmitting characteristics are not affected by changes in temperature of surrounding air and which, though of lightweight construction, can take up and resist substantial tensional, flexing, compressive, torsional and other stresses.

A further object of the invention is to provide a self-supporting multi-section wave guide which is assembled in such a way that it can withstand stresses arising in actual use regardless of whether its top section is suspended at the upper end of a tower or whether its lowermost section rests on a fixed support.

An additional object of the invention is to provide improved self-supporting sections which may be assembled to form a wave guide and to provide novel skeleton frames for use in such sections.

Briefly stated, one feature of my invention resides in the provision of an improved wave guide which comprises a plurality of flanged tubular sections of rectangular cross-sectional outline. Each section includes a rigid skeleton frame comprising four corner posts and the material and dimensions of the skeleton frame are such as to render the respective section self-supporting, i.e., the skeleton frame is capable of taking up the full weight of the respective section regardless of whether the wave guide is mounted in a horizontal or vertical position and regardless of whether an upright wave guide is suspended at its upper end or is mounted to rest on its lowermost section. The corner posts are secured to the end flanges of the respective sections and form reinforcements for the four corners of the corresponding section. The connections between the corners posts and the end flanges may include tubes which are slipped over and are bolted to the ends of the respective corner posts and sleeves one end of which is either integral with or bolted to the corresponding tube. The other end of each sleeve is rigidly connected with the respective end flange.

In accordance with another feature of my invention, the tower or another support in or on which the wave guide is mounted may be provided with rails or similar guide means which cooperate with suitable lugs or other types of followers provided on the corner posts or on other parts of the skeleton frames to allow for changes in the overall length of the wave guide in response to temperature changes.

If the uppermost section is to be suspended at the top of an aerial tower or a similar support, the upper sleeve of the uppermost section may be provided with a suitable collar or an analogous projection which is bolted or otherwise affixed to the topmost platform of the tower.

The novel features which are considered as characteristic of the invention are set forth in particular in the appended claims. The improved wave guide itself, however, both as to its construction and the mode of assembling and mounting the same, together with additional features and advantages thereof, will be best understood upon perusal of the following detailed description of a specific embodiment with reference to the accompanying drawings, in which:

FIG. 1 is a fragmentary longitudinal section through a section which constitutes one component of a wave guide embodying my invention, the section of FIG. 1 being taken in the direction of arrows as seen from the line I—I of FIG. 2;

FIG. 2 is a fragmentary side elevational view of the structure shown in FIG. 1, with a portion of the section broken away;

FIG. 3 is a transverse section as seen in the direction of arrows from the line III—III of FIG. 2;

FIG. 4 is another transverse section as seen in the direction of arrows from the line IV—IV of FIG. 2;

FIG. 5 is a diagrammatic fragmentary side elevational view of an aerial tower which supports an upright wave guide assembled of sections constructed as shown in FIGS. 1 to 4;

FIG. 5a is a schematic top plan view of the structure shown in FIG. 5;

FIG. 6 is an enlarged fragmentary horizontal section through the tower as seen in the direction of arrows from the line VI—VI of FIG. 5;

FIG. 7 is a side elevational view of the structure shown in FIG. 6; and

FIG. 8 is a fragmentary side elevational view of the uppermost section in the wave guide of FIG. 5.

Referring to the drawings, FIGS. 1 and 2 illustrate a portion of a section A which constitutes one component of an elongated wave guide WG shown in FIG. 5. The side walls of the section A are built up of several layers including a circumferentially complete inner layer 1 of suitably deformed sheet metal forming an opening of rectangular outline, outer layers 3 which also consist of metallic sheet stock, and intermediate layers 2 each of which is a honeycomb structure and whose cells extend in directions at right angles to the axis of the section A. In the zone where the longitudinal edge portions 1a, 1b of the inner layer 1 are abutting each other (see FIGS. 3 and 4), the corresponding median and outer layers 2, 3 accommodate a profiled fillet 4 which is parallel with the longitudinal extension of the section A. The corners of this section are reinforced by four solid profiled posts 5a, 5b, 5c, 5d which extend into spaces between the adjoining layers 2, 3 and are provided with diagonally extending outwardly projecting followers or lugs 10. The dimensions of the corner posts 5a–5d are selected in such a way that, when connected to the end flanges 8, they form part of a skeleton frame which can take up the full weight of the entire section A. Such connections are established by bolts, screws or similar fasteners 9 and 9a. FIG. 4 shows that the corner posts 5a–5d are provided with pairs of longitudinally extending lips 14 which overlie the adjacent portions of the outer layers 3. The lips 14 are secured to the layers 3 by a suitable adhesive or the like, and their purpose is to form fluidtight seals along the corners of the section A.

By way of example, the section A can have a length of four meters and its weight may be about 50 kg. If the wave guide WG (see FIG. 5) is assembled of seventy-five sections, its total weight is 3.75 metric tons. The material of the corner posts 5a–5d is an aluminum alloy which, with the required safety factor in mind, can be subjected to stresses in the range of up to 3 kg./mm.$^2$. Thus, the combined cross-sectional area of the four corner posts must be at least 1,250 mm.$^2$, and the cross-sectional area of each individual corner post is at least 312 mm.$^2$. If the wall thickness of the section A is 20 mm., its corners may readily accommodate posts with a cross-sectional area of 400 mm.$^2$ which is ample for the wave guide having a length of up to 385 meters. If the wave guide is to be made longer, the corner posts 5a–5d will consist of a stronger material or their cross-sectional area is increased accordingly.

It will be seen that, in the wave guide of my present invention, the skeleton frames including the corner posts 5a–5d must carry the combined weight of all sections.

The novel connections between the corner posts 5a–5d and the end flanges 8 are assembled in the following way: As shown in FIGS. 1 and 2, the end flange 8 extends beyond the outlines of the outer layers 3 and is glued to a metallic sleeve 7. This sleeve 7 is bolted to a tube 6 which is telescoped onto the corresponding end portions of the outer layers 3 and which also surrounds the corresponding ends of the corner posts 5a–5d, see particularly FIG. 3. The corner posts are shorter than the section A. Bolts 9 connect the tube 6 with the corner posts 5a–5d, and similar bolts 9a connect the tube with the inner end of the sleeve 7, see FIGS. 1 and 2. It will be noted that the outer end portion 6a of the tube 6 extends beyond the outer layers 3 and that the bolts 9a connect this end portion 6a to the reinforced inner end portion 7a of the sleeve 7. The outer end portion 7b of the sleeve 7 is in face-to-face abutment with the end flange 8. The inner layer 1 extends to and slightly beyond the outer end face of the flange 8. This is clearly shown in FIGS. 1 and 2. The lugs 10 terminate at the inner end of the tube 6.

If desired, the tube 6 and sleeve 7 can form an integral unit so that the bolts 9a may be dispensed with. This unit can be produced by forging, stamping or molding. However, the internal surfaces of the parts 6, 7 are more readily accessible and can be finished with greater precision if they are not integrally connected to each other.

As disclosed in my aforementioned copending application Ser. No. 285,327, the tube 6 and sleeve 7 are connected only with the outer layers 3 but not with the inner layer 1 of the section A. The layer 1 is connected with the end flange 8 which is secured to the collar 7b by a suitable adhesive or in another way.

An upright wave guide WG, such as the one shown in FIG. 5 and consisting of interconnected sections A, is capable of taking up all longitudinal (tensional and/or compressive) stresses. However, and in order to properly secure the wave guide against lateral stresses, such as will develop in response to the action of wind currents, the lugs 10 are guided in suitable rails or ways shown in FIGS. 4, 5 and 6. Each such rail comprises an arm 11 having a notch to receive a portion of the corresponding lug 10, and a cover plate 12 which is detachably secured to the arm 11 by one or more bolts or screws 13. The arms 11 and cover plates 12 define channels which receive the lugs 10 and such lugs may be provided only on the median portions of the corner posts 5a–5d. The arms 11 are attached to the elements of an aerial tower AT shown in FIG. 5. FIG. 4 shows that two rails 11–13 suffice for a section A even though such sections may be guided in three or four rails if desired. It is clear that the rails allow the wave guide to change its length but will hold it against lateral movement. The rails which guide a given section A may but need not be mounted at the same level and the pairs of rails engaging a first section may be angularly displaced with reference to the pairs of rails which engage and guide the lugs of a section located above or below such first section.

The situation is similar when the wave guide is mounted in horizontal position. One end of the wave guide is then firmly connected with the supporting structure and the individual sections are guided by rails so that the wave guide may expand or contract.

Referring now in detail to FIGS. 5 and 5a, the tower AT is of familiar construction and is propped by guy wires 16. As seen, the abutting flanges 8 of adjoining sections A are bolted together at levels between the platforms 17 of the tower AT so as not to interfere with the construction of platforms. Each platform supports two or more guide rails 11–13 so that the wave guide WG may expand or contract in response to temperature changes whereby the lugs 10 slide in the channels of the respective rails. The upper end of the wave guide leads to the aerial and its lower end leads to the transmitter building. A suitable bend B is inserted between the lowermost upright section A' and the horizontal section A".

FIGS. 6 and 7 illustrate the manner in which the rails 11–13 are mounted on a platform 17 of the tower AT. For the sake of clarity, all bolts with the exception of bolts 13 were omitted. In these illustrations, the section A is guided in four rails 11–13 and the arms 11 of these rails are bolted to plate-like carriers 15 which, in turn, are bolted to the structural elements of the platform 17.

Referring finally to FIG. 8, there is shown the upper end portion of the topmost section AA of a wave guide which is suspended at the upper end of a tower, i.e., which is secured to the uppermost platform. The tube 18 replaces the tube 6 of FIGS. 1 and 2 and this tube has an outwardly projecting portion 19 which is affixed to the topmost platform. The end flange 8 of the section AA is electrically connected with the aerial by using coaxial cables, rigid lines or further wave guides, not shown.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. In a wave guide, an elongated tubular section of rectangular cross-sectional outline, said section comprising four side walls and said side walls together forming a circumferentially complete inner layer and defining longitudinally extending spaces at the four corners of said section; a rigid corner post provided in each of said spaces and fixedly secured to the adjoining side walls, said corner posts being shorter than said section so that the end portions of the section extend beyond the respective ends of such corner posts; a pair of rigid tubes each surrounding the ends of said corner posts and each adjacent to one end portion of said section; fastener means securing said tubes to said corner posts; a sleeve surrounding each end portion of said section and having a first end rigid with the corresponding tube; and a flange rigid with the second end of each sleeve, said corner posts, said tubes, said sleeves and said flanges together forming a rigid skeleton frame whose material and dimensions are such that said section is self-supporting and is capable of withstanding stresses which arise when a wave guide assembled of such sections is mounted in an upright or inclined position.

2. A section as set forth in claim 1, wherein said sleeves are integral with the respective tubes.

3. A section as set forth in claim 1, wherein said sleeves are bolted to the respective tubes and wherein said fastener means are bolts detachably fixing the tubes to said corner posts.

4. A section as set forth in claim 1, wherein said end flanges are bonded to the second ends of the respective sleeves.

5. A section as set forth in claim 1, wherein each of said side walls comprises an intermediate layer which is a honeycomb structure.

6. A guide arrangement for transmission of electric waves, comprising an elongated support having a plurality of longitudinally spaced guide means; an elongated wave guide comprising a plurality of tubular sections of rectangular cross-sectional outline and joined end-to-end, each of said sections comprising a rigid skeleton frame including four corner posts and the material and dimensions of said skeleton frame being such as to render the respective section self-supporting; and follower means provided on said corner posts and cooperating with said guide means to hold the wave guide against movement in response to lateral stresses but to allow for changes in the overall length thereof.

7. A guide arrangement as set forth in claim 6, wherein each of said guide means defines a channel and wherein said followers are lugs slidably extending into the respective channels.

8. A guide arrangement as set forth in claim 6, wherein said support is an upright tower having a plurality of platforms, and wherein said guide means are secured to said platforms.

9. A guide arrangement as set forth in claim 8, wherein said wave guide comprises an uppermost section having an upper end portion provided with a collar attached to the topmost platform of said tower so that the entire wave guide is suspended from said topmost platform.

10. A guide arrangement as set forth in claim 8, wherein said sections comprise interconnected end flanges and wherein such flanges are located at levels other than the levels of said platforms.

11. A guide arrangement for transmission of electric waves, comprising an elongated support having a plurality of longitudinally spaced guide means; an elongated wave guide comprising a plurality of tubular sections of rectangular cross-sectional outline and joined end-to-end, each of said sections comprising a rigid skeleton frame including four corner posts and the material and dimensions of said skeleton frame being such as to render the respective section self-supporting; and follower means provided on each of said skeleton frames and cooperating with said guide means to hold the wave guide against movement in response to lateral stresses but to allow for changes in the overall length thereof.

12. A guide arrangement as set forth in claim 11, wherein each of said guide means defines a channel and wherein said followers are lugs integral with said corner posts.

13. A guide arrangement as set forth in claim 11 wherein at least the corner posts of said skeleton frames consist of an aluminum alloy.

14. A guide arrangement for transmission of electric waves, comprising an elongated support having a plurality of longitudinally spaced guide means; an elongated wave guide comprising a plurality of tubular sections of rectangular cross-sectional outline and joined end-to-end, each of said sections comprising a rigid skeleton frame and the material and dimensions of each skeleton frame being such as to render the wave guide self-supporting; and follower means provided on at least some of said skeleton frames and cooperating with said guide means to hold the wave guide against movement in response to excessive lateral stresses but to allow for changes in the overall length of the wave guide.

15. A guide arrangement as set forth in claim 14, wherein each of said skeleton frames comprises two axially spaced tubular portions and posts connecting such tubular portions to each other.

References Cited

UNITED STATES PATENTS 3,234,489  2/1966  Hahne _____ 333—95

HERMAN KARL SAALBACH, *Primary Examiner.*

L. ALLAHUT, *Examiner.*